(12) United States Patent
Hsieh et al.

(10) Patent No.: US 9,996,178 B2
(45) Date of Patent: Jun. 12, 2018

(54) TOUCH DISPLAY PANEL

(71) Applicant: Innolux Corporation, Miao-Li County (TW)

(72) Inventors: Hong-Sheng Hsieh, Miao-Li County (TW); Hao-Yu Liou, Miao-Li County (TW); Yu-Sheng Chen, Miao-Li County (TW); Jian-Cheng Chen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days. days.

(21) Appl. No.: 15/427,170

(22) Filed: Feb. 8, 2017

(65) Prior Publication Data

US 2017/0255289 A1 Sep. 7, 2017

(30) Foreign Application Priority Data

Mar. 4, 2016 (TW) .............................. 105106748 A

(51) Int. Cl.
*G06F 3/041* (2006.01)
*G06F 3/044* (2006.01)
*G02F 1/1333* (2006.01)

(52) U.S. Cl.
CPC ........ *G06F 3/0412* (2013.01); *G02F 1/13338* (2013.01); *G06F 3/041* (2013.01); *G06F 3/044* (2013.01)

(58) Field of Classification Search
CPC ........ G06F 3/041; G06F 3/0412; G06F 3/044; G02F 1/1333–1/13338
See application file for complete search history.

(56) References Cited

U.S. PATENT DOCUMENTS

2012/0031746 A1* 2/2012 Hwang .................. G06F 3/041
200/5 A
2012/0249901 A1* 10/2012 Sekine ............... G02B 27/2214
349/15

(Continued)

*Primary Examiner* — David Tung
(74) *Attorney, Agent, or Firm* — McClure, Qualey & Rodack, LLP

(57) ABSTRACT

A touch display panel includes a display structure and a touch structure. The display structure includes pixels having a first pitch P1. The touch structure includes a touch layer having slits and dummy clefts. The slits and the dummy clefts have a second pitch P2 and a third pitch P3, respectively. Two adjacent vertices of each slit define a line segment having a length Ly.
A first moire ratio (MR1) defined as $$\frac{P2}{P1}$$

satisfies: $20.7\% \times A_1 + 8.5\% \times B_1 - 3\% \leq MR1 \leq 12.7\% \times A_1 + 16.5\% \times B_1 + 3\%$, wherein $A_1$ is an integer from 0 to 3, $B_1$ is an integer from 1 to 3, and $0 \leq B_1 - A_1 \leq 1$.
A second moire ratio (MR2) defined as $$\frac{P3}{P1}$$

satisfies: $20.7\% \times A_2 + 8.5\% \times B_2 - 3\% \leq MR2 \leq 12.7\% \times A_2 + 16.5\% \times B_2 + 3\%$, wherein $A_2$ is an integer from 0 to 3, $B_2$ is an integer from 1 to 3, and $0 \leq B_2 - A_2 \leq 1$.
An arrangement ratio (LR) defined as $$\frac{Ly}{P1}$$

(Continued)

satisfies: $(2C+1)\times25\%-20\% \leq LR \leq (2C+1)\times25\%+20\%$, wherein C is an integer from 0 to 11.

10 Claims, 9 Drawing Sheets

(56) References Cited

U.S. PATENT DOCUMENTS

| | | | | |
|---|---|---|---|---|
| 2014/0092323 A1* | 4/2014 | Hwang | ............... | G06F 3/041 |
| | | | | 349/12 |
| 2014/0098307 A1* | 4/2014 | Iwami | ............... | B32B 15/02 |
| | | | | 349/12 |
| 2014/0360856 A1* | 12/2014 | Mizumoto | ............... | G06F 3/044 |
| | | | | 200/600 |
| 2015/0324024 A1* | 11/2015 | Hwang | ............... | G06F 3/041 |
| | | | | 345/173 |
| 2015/0355751 A1* | 12/2015 | Kurasawa | ............... | G06F 3/044 |
| | | | | 345/174 |

\* cited by examiner

TOUCH DISPLAY PANEL

This application claims the benefit of Taiwan application Serial No. 105106748, filed on Mar. 4, 2016, the disclosure of which is incorporated by reference herein in its entirety.

TECHNICAL FIELD

The disclosure relates to a touch display panel.

BACKGROUND

In order to make the operation more convenient and intuitive to the user, conventional display panels have been gradually replaced with touch display panels of which each includes a display structure and a touch structure. The touch display panels can be used in many fields such as navigation system, automatic teller machine, point of sale terminal, laptop and smartphone. However, the design of simply stacking the display structure and the touch structure cannot satisfy people's pursuit of better display and touch effects. Therefore, it is necessary to improve the matching relationship between the display structure and the touch structure of the touch display panel in all aspects.

SUMMARY

The disclosure is directed to an improved touch display panel, particularly to the improvement in the matching relationship between the display structure and the touch structure of the touch display panel.

According to some embodiments, a touch display panel includes a display structure and a touch structure. The display structure includes a plurality of pixels. The pixels have a first pitch P1. The touch structure includes a touch layer having a plurality of slits and a plurality of dummy clefts. Each slit has a plurality of vertices. The slits define a plurality of traces and a plurality of touch regions. The dummy clefts are disposed in the touch regions. The slits and the dummy clefts are substantially arranged along a first direction. The slits have a second pitch P2 in the first direction. The dummy clefts have a third pitch P3 in the first direction. The slits and the dummy clefts are arranged as a zigzag shape which substantially extends along a second direction. Two adjacent vertices of each slit define a line segment. The line segment has a first length Ly in the second direction. A first moire ratio MR1 is defined as $$\frac{P2}{P1}.$$

The first moire ratio MR1 substantially satisfies a formula (1):

$$20.7\% \times A_1 + 8.5\% \times B_1 - 3\% \leq MR1 \leq 12.7\% \times A_1 + 16.5\% \times B_1 + 3\% \quad (1),$$

wherein $A_1$ is an integer from 0 to 3, $B_1$ is an integer from 1 to 3, and $0 \leq B_1 - A_1 \leq 1$. A second moire ratio MR2 is defined as $$\frac{P3}{P1}.$$

The second moire ratio MR2 substantially satisfies a formula (2):

$$20.7\% \times A_2 + 8.5\% \times B_2 - 3\% \leq MR2 \leq 12.7\% \times A_2 + 16.5\% \times B_2 + 3\% \quad (2),$$

wherein $A_2$ is an integer from 0 to 3, $B_2$ is an integer from 1 to 3, and $0 \leq B_2 - A_2 \leq 1$. An arrangement ratio LR is defined as $$\frac{Ly}{P1}.$$

The arrangement ratio LR substantially satisfies a formula (3):

$$(2C+1) \times 25\% - 20\% \leq LR \leq (2C+1) \times 25\% + 20\% \quad (3),$$

wherein C is an integer from 0 to 11.

Figure 1:
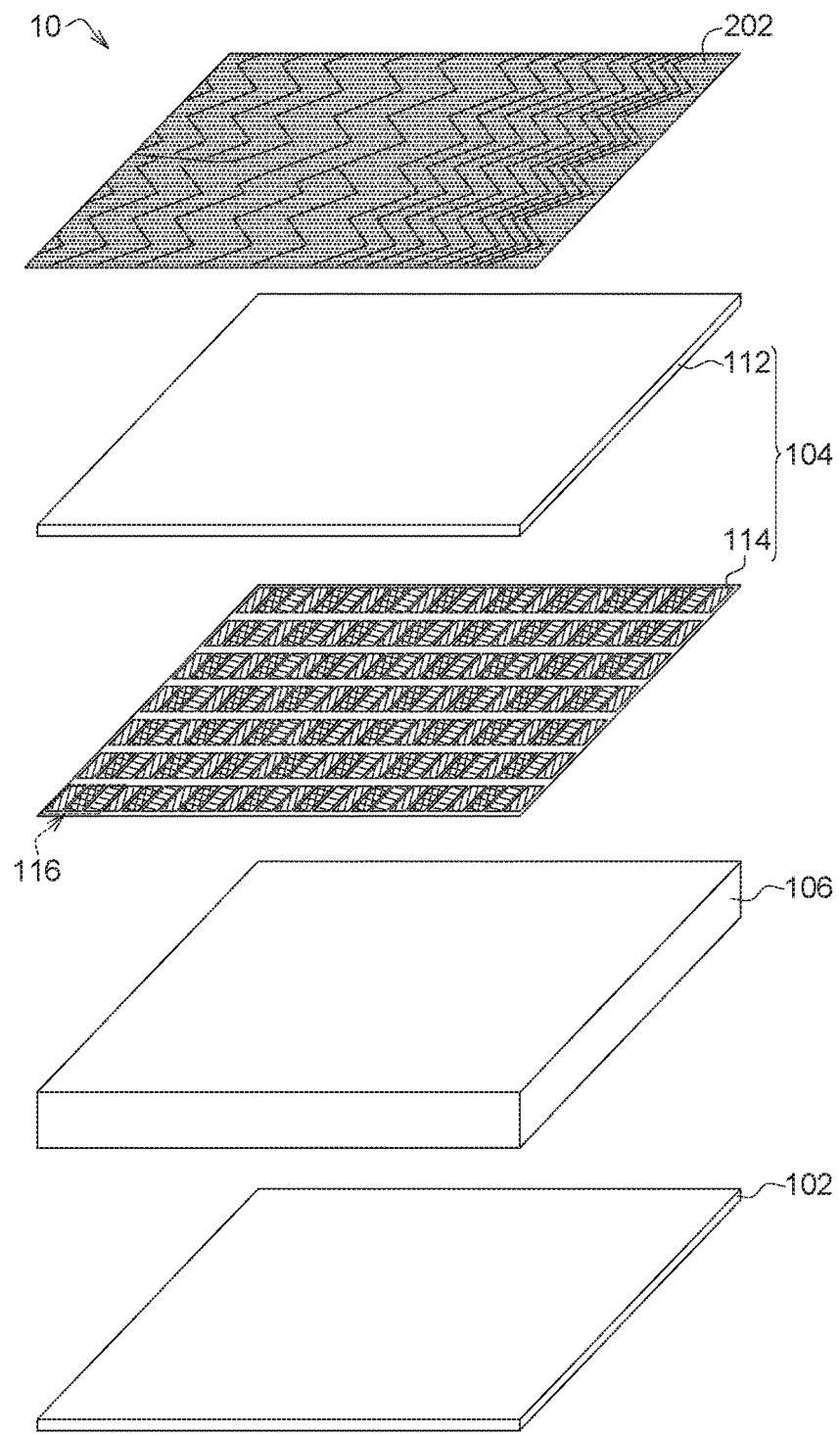
FIGS. 1 and 2 are schematic diagrams of a touch display panel of a touch display device according to disclosed embodiments.

In the following detailed description, for purposes of explanation, numerous specific details are set forth in order to provide a thorough understanding of the disclosed embodiments. However, it will be apparent that one or more embodiments may be practiced without these specific details. In other instances, well-known structures and devices are schematically shown in order to simplify the drawing.

DETAILED DESCRIPTION

Detailed descriptions of the embodiments are made with reference to accompanying drawings. For clarity, elements shown in the figures may not reflect their actual sizes. Besides, some elements may be omitted from the figures.

A touch display device includes a touch display panel. Detailed descriptions of the touch display panel according to the embodiments will be disclosed in the following paragraphs. The touch display device generally includes other elements (not shown in the figures) in addition to the touch display panel, such as a control circuit, or other elements used with the touch display panel like a backlight. To avoid the key points of the disclosure being confused, descriptions of such elements will not be particularly disclosed.

Figure 2:
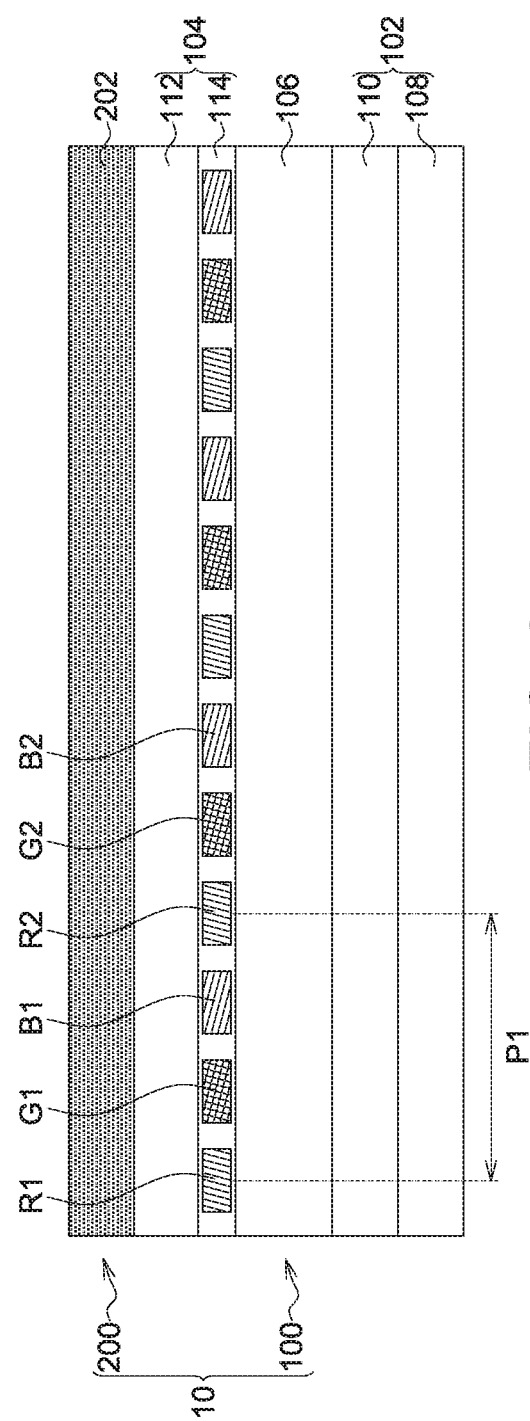

Referring to FIGS. 1 and 2, a schematic diagram of a touch display panel 10 according to embodiments and a cross-sectional view of the touch display panel 10 are shown, respectively. The touch display panel 10 includes a display structure 100 and a touch structure 200.

According to some embodiments, the display structure 100 may be a liquid crystal display (LCD) structure, as shown in FIGS. 1 and 2. In other embodiments, the display structure may be a self-luminous organic light-emitting diode (OLED) display structure, a self-luminous inorganic light-emitting diode (LED) display structure, a reflective electronic paper display (EPD) display structure, or a Quantum Dot (QD) display structure. The display structure 100 typically includes a first substrate 102, a second substrate 104, and a display layer 106 between the first substrate 102 and the second substrate 104. Specifically, the first substrate 102 may be a thin-film transistor substrate for inputting signals and controlling display images. The first substrate 102 includes a substrate 108 and a thin-film transistor layer 110. The substrate 108 can comprise a transparent material such as glass, sapphire, plastic, resin or other transparent polymer materials. In other embodiments, if the penetrability is not required, the substrate 108 can comprise a non-transparent material such as metal, silicon or glass fiber. The thin-film transistor layer 110 includes circuits and elements such as thin-film transistors, scan lines, data lines, common signal lines, storage capacitors, pixel electrodes, common electrodes, and diodes. The scan lines and the data lines intersect and form a plurality of sub-pixels. Signal input of each sub-pixel can be independently controlled by a thin-film transistor. A number of sub-pixels can form a pixel 116 capable of displaying various gray levels and colors. The second substrate 104 may be a color filter substrate or a protection substrate. The second substrate 104 includes a substrate 112, an electrode layer or a color filter layer 114. A material of the substrate 112 can comprise a transparent material such as glass, sapphire, plastics, resin or other transparent polymer material. The color filter layer 114 includes various color filters capable of filtering the light into different colors. For example, the color filter layer 114 may include red (R), green (G), blue (B), white (W), or yellow (Y) filters corresponding to different sub-pixels. A plurality of color filters can be combined to display different gray levels and colors. In an embodiment, a pixel display unit can be formed of three sub-pixels corresponding to the RGB color filter layer 114. In other embodiments, the pixel display unit can correspond to WRGB, RGBY, RG, GB, RB, or RRGGBB color filters. For example, referring to FIG. 2, the red sub-pixel R1, the green sub-pixel G1 and the blue sub-pixel B1 of a pixel as well as the red sub-pixel R2, the green sub-pixel G2 and the blue sub-pixel B2 of another pixel are shown. The pixel 116 has a first pitch P1, which refers to the width of the pixel 116, or refers to the pitch between the geometric centers of the pixels 116. For example, referring to FIG. 2, each of the pixels comprises three sub-pixels (ex. RGB), the first pitch P1 can be calculated from the geometric center of a first red sub-pixel R1 to that of a second red sub-pixel R2. In the present embodiment, the display layer 106 can be a liquid crystal layer, and the second substrate 104 has a color filter layer 114. In other embodiments, the display layer 106 may be organic light-emitting diodes, inorganic light-emitting diodes, or other materials or elements, or a combination thereof. The second substrate 104 can be the substrate 112 only for covering or protecting, and does not have to include the color filter layer 114. Alternatively, the second substrate 104 can have a color layer of quantum dots or other fluorescent or phosphorescent materials, and it's not limited to. It should be noted that the display structure 100 is not limited to the structure illustrated in FIGS. 1 and 2. For example, relative positions of the layers can be adjusted, and some layers can be added or removed. Alternatively, according to some other embodiments, the display structure 100 may be an LED display structure, an OLED display structure, or other suitable display structures. Regardless which display structure is used, the display structure includes a plurality of pixels 116 having a first pitch P1.

The touch structure 200 may include a touch layer 202. Detailed descriptions of the structural configuration of the touch structure 200 will be disclosed in the following paragraphs with reference to FIGS. 3A-3B. The touch layer 202 may be a transparent electrode layer. The transparent electrode layer can comprise a transparent conductive oxide (TCO) such as indium tin oxide (ITO) or other suitable conductive materials like indium zinc oxide (IZO), indium gallium zinc oxide (IGZO), zinc oxide (ZnO), aluminum zinc oxide (AZO), gallium zinc oxide (GZO) or indium-doped molybdenum oxide (IMO), or metal films or metal traces having a thickness of nm level formed of gold (Au), silver (Ag), platinum (Pt), copper (Cu), aluminum (Al), titanium (Ti) or chromium (Cr) and the like. The transparent electrode layer can comprise a single-layer, a multi-layer, or a combination thereof. For example, the transparent electrode layer may be a singled-layered ITO film. Alternatively, the transparent electrode layer may be a multi-layer comprising an Ag film disposed between two IZO layers (IZO-Ag-IZO). The touch layer 202 may have a plurality of slits. The slits define a plurality of traces and a plurality of touch regions. The traces and the touch regions are electrically connected and used for signal transmission. The touch layer 202 may further have a plurality of dummy clefts disposed in the touch regions for improving the optical properties of the touch layer 202. When the user touches a touch region, the touch region generates capacitance change, resistance change, voltage change or other suitable signal change in response to the user's touch. The generated changes are transmitted outwards through the traces. For example, when the touch structure 200 uses a mutual capacitive touch mode, the touch region may include a transmission sensing zone (Tx) and a reception sensing zone (Rx). The traces can transmit a touch transmission signal (Tx signal) and a touch reception signal (Rx signal) to the transmission sensing zone and the reception sensing zone, respectively. When the touch structure 200 uses the self-capacitive touch mode, the touch region is used as a touch detecting unit, and a touch reference signal and a touch sensing signal can be inputted or outputted with respect to the touch detecting unit. It should be noted that while the touch structure 200 shown in FIGS. 1 and 2 is located above the display structure 100 (that is, the touch display panel adopts an on-cell touch design), the relative relationship between the display structure 100 and the touch structure 200 is not limited thereto. For example, the touch structure 200 and the display structure 100 can be integrated as one unit. For example, the touch display panel can adopt a hybrid in-cell touch design or an in-cell touch design, in which partial or entire structure of the touch structure 200 is disposed on the first substrate 102 and between the first substrate 102 and the second substrate 104. In other embodiments, the touch structure 200 and the display structure 100 can be separated from each other. For example, the touch display panel can adopt an out-cell touch design in which the touch structure 200 and the second substrate 104 are separated by an interval.

Figure 3A:
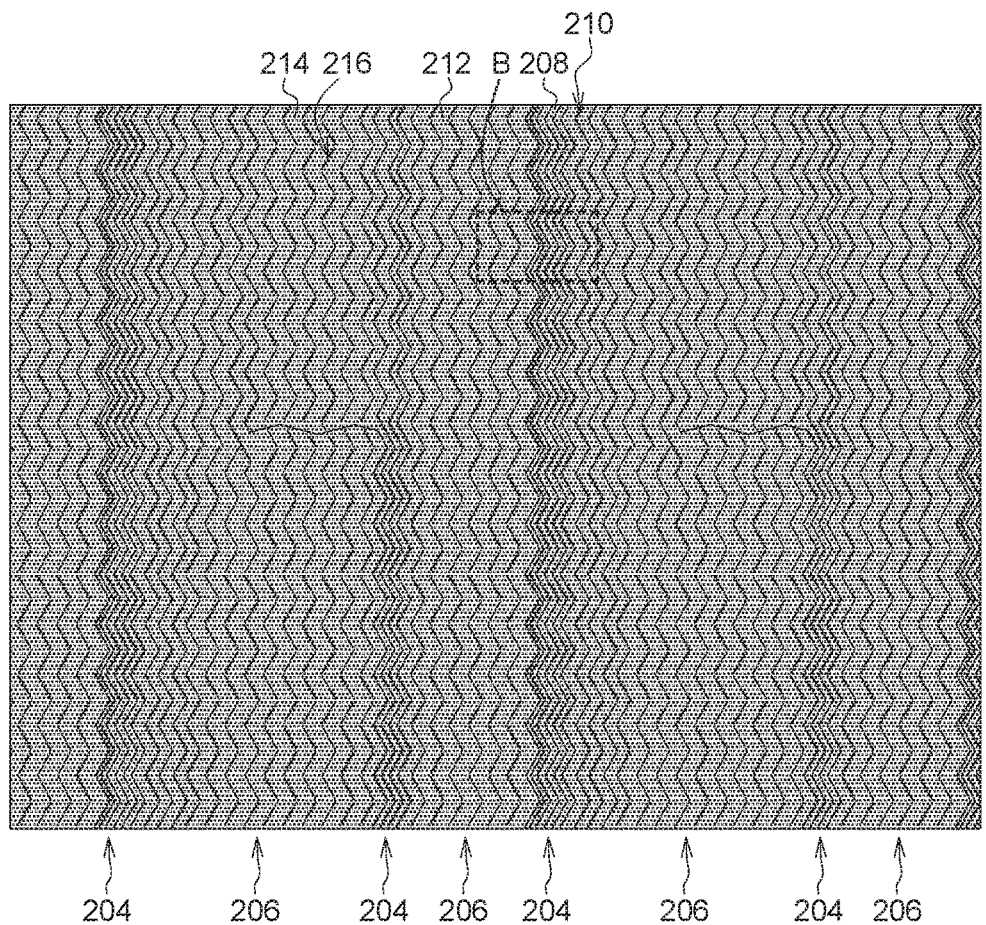
FIGS. 3A-3B are schematic diagrams of a touch structure of a touch display panel according to disclosed embodiments.
Figure 3B:
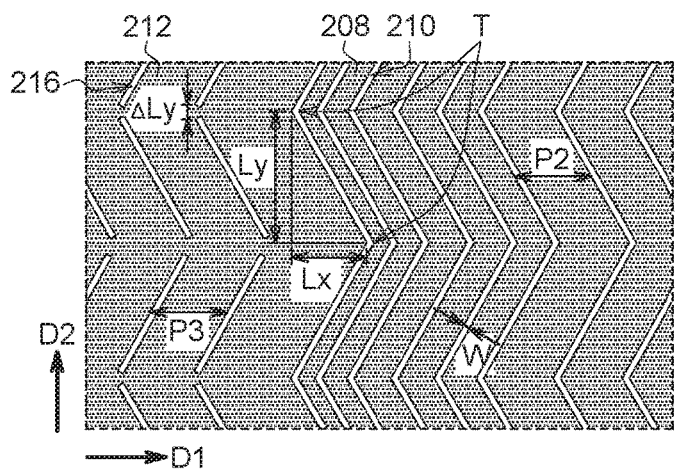

Referring to FIGS. 3A-3B, schematic diagrams of a touch layer 202 according to some embodiments of the disclosure are shown, wherein FIG. 3B is an enlarged view of the region B in FIG. 3A. The touch layer 202 may include trace regions 204 and touch regions 206. Each trace region 204 includes a plurality of traces 208. Each touch region 206 includes a transmission sensing zone 212 and a reception sensing zone 214. The traces 208, the transmission sensing zones 212, and the reception sensing zones 214 are separated by the slits 210. The dummy clefts 216 are disposed in the transmission sensing zones 212 and the reception sensing zones 214. The dummy clefts 216 simulate the pattern of the slits 210. Unlike the slits 210 which are used for dividing the traces 208, the transmission sensing zones 212 or the reception sensing zones 214 into a plurality of independent entities, the dummy clefts 216 are used as openings. The slits 210 and the dummy clefts 216 are substantially arranged at an interval along a first direction D1. Here, the term "substantially" means that most of the slits 210 are arranged along the first direction D1 at an interval except for a number of the slits 210 used for defining the traces 208 and the touch regions 206. The slits 210 have a second pitch P2 in the first direction D1. The second pitch P2 is the distance between the centers of two adjacent slits 210 or the distance between the edges on the same side of two adjacent slits 210 in the first direction D1. For example, the second pitch P2 is 42.6 μm. The dummy clefts 216 have a third pitch P3 in the first direction D1. The third pitch P3 is the distance between the centers of two adjacent dummy clefts 216 or the distance between the edges on the same side of two adjacent dummy clefts 216 in the first direction D1. The slits 210 and the dummy clefts 216 are arranged as a zigzag shape or a wave shape substantially extending along a second direction D2 (which is, for example, perpendicular to the first direction D1) to avoid moire phenomenon. Each slit 210 includes a plurality of vertices T. Vertices T are the vertex at which the zigzag or wavy line segments deflect. The line connecting two adjacent vertices T of the same slits 210 defines a line segment, which has a third length. The line segment has a second length Lx projected on the first direction D1 and a first length Ly projected on the second direction D2. According to some embodiments, Lx is smaller than Ly. In other embodiments, Lx can be larger than or substantially equal to Ly. The slits 210 and the dummy clefts 216 can have substantially the same configuration pattern. For example, the slits 210 and the dummy clefts 216 substantially have the same width W, such as 6 μm. The slits 210 and the dummy clefts 216 may be different only in that the du rimy clefts 216 are discontinuous. The dummy clefts 216 have a fourth length smaller than the third length. The dummy clefts 216 are disconnected at the vertices T or other positions by a fifth length ΔLy, which is defined as a projection on the second direction D2. It should be noted that, in the present embodiment, the line segment defined by the vertices T is not equal to the section forming a dummy cleft 216. Since the dummy clefts 216 are disconnected at the vertices T or other positions, the section forming the dummy cleft 216 is slightly shorter than the line segment.

When the touch display panel displays black color, the visibility under various light sources will be affected by the structural configuration of the touch layer 202. Specifically, if the third pitch P3 of the dummy clefts 216 is much larger than the second pitch P2 of the slits 210, bright line group will be generated in the black background under the illumination of the light source due to the density difference between the slits and the dummy clefts. Besides, when the slits 210 and the dummy clefts 216 have a larger length Ly, bright fringes and dark fringes will be generated under the illumination of the light source because the zigzag shape comprises line segments in two different directions. The above phenomena can be resolved by adjusting the second pitch P2 of the slits 210 and the third pitch P3 of the dummy clefts 216 such that the density of the slits 210 and the density of the dummy clefts 216 can be closer to each other and by reducing the length Ly of the slits 210 and the dummy clefts 216 such that the zigzag shape can be closer to a straight line. However, such adjustment will easily lead to an exacerbation of the moire effect, particularly when the first pitch P1 of the pixels 116 exactly falls in the first direction D1 or the second direction D2. Therefore, the relationships among the first pitch P1 and the second pitch P2, the third pitch P3, as well as the length Ly must satisfy certain conditions, such that the moire phenomenon can be avoided during an improvement of the visibility when the touch display panel displays black color.

Firstly, a first moire ratio (first ratio) MR1 is defined as $$\frac{P2}{P1}.$$

The first moire ratio MR1 must substantially satisfy a formula (1):

$$20.7\% \times A_1 + 8.5\% \times B_1 - 3\% \leq MR1 \leq 12.7\% \times A_1 + 16.5\% \times B_1 + 3\% \quad (1),$$

wherein $A_1$ is an integer from 0 to 3, $B_1$ is an integer from 1 to 3, and $0 \leq B_1 - A_1 \leq 1$.

Next, a second moire ratio (second ratio) MR2 is defined as $$\frac{P3}{P1}.$$

The second moire ratio MR2 must substantially satisfy a formula (2):

$$20.7\% \times A_2 + 8.5\% \times B_2 - 3\% \leq MR2 \leq 12.7\% \times A_2 + 16.5\% \times B_2 + 3\% \quad (2),$$

wherein $A_2$ is an integer from 0 to 3, $B_2$ is an integer from 1 to 3, and $0 \leq B_2 - A_2 \leq 1$.

Then, an arrangement ratio LR is defined as $$\frac{Ly}{P1}.$$

The arrangement ratio LR must substantially satisfy a formula (3):

$$(2C+1) \times 25\% - 20\% \leq LR \leq (2C+1) \times 25\% + 20\% \quad (3),$$

wherein C is an integer from 0 to 11.

The second pitch P2 and the third pitch P3 may fall within the same range obtained when $A_1 = A_2$ and $B_1 = B_2$ to avoid the occurrence of bright lines caused by the density difference between the slits 210 and the dummy clefts 216. In some embodiments, the second pitch P2 is substantially equal to the third pitch P3. However, if the difference between the second pitch P2 and the third pitch P3 is not large enough to make the bright lines noticeable to human eyes, the situation that $A_1 \neq A_2$ and $B_1 \neq B_2$ is also acceptable. For example, the second pitch P2 and the third pitch P3 may satisfy: $0.66 \leq P2/P3 \leq 1.5$.

Figure 4:
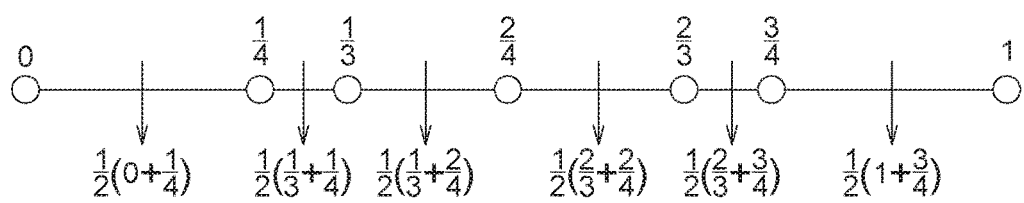
FIG. 4 is a schematic diagram showing the principles for choosing the pitches of the slits and the dummy clefts of a touch structure according to disclosed embodiments.

Principles of the above formulas are explained below. Referring to FIG. 4, it is found that the moire phenomenon is worst to the perception of Human Eyes when the Relationship with Respect to Multiples of ⅓ and ¼ exists between the second pitch P2, the third pitch P3 and the first pitch P1. Therefore, the second pitch P2, the third pitch P3 and the first pitch P1 need to be adjusted to avoid such relationship. Thus, the range of the first moire ratio MR1 is defined as $$\frac{1}{2}\left(\frac{A}{3}+\frac{B}{4}\right)\pm C\ \%,$$

wherein A is an integer from 0 to 3, B is an integer from 1 to 3, and 0≤B−A≤1. Moreover, when B−A=1, let C=7, and when B−A=0, let C=3. The formulas (1) and (2) are thereby obtained by organizing the above expressions. Here, the term "substantially" relating the formulas means that the deviations due to the conversion from fraction number to decimal number is tolerable.

Similarly, it is found that the moire phenomenon is worst to the perception of human eyes when the relationship with respect to multiples of ½ exists between the length Ly and the first pitch P1. Thus, the length Ly needs to be adjusted, such that the length Ly and the first pitch P1 do not have such relationship. Thus, the range of the arrangement ratio LR can be defined and thereby the formula (3) is obtained.

Figure 5A:
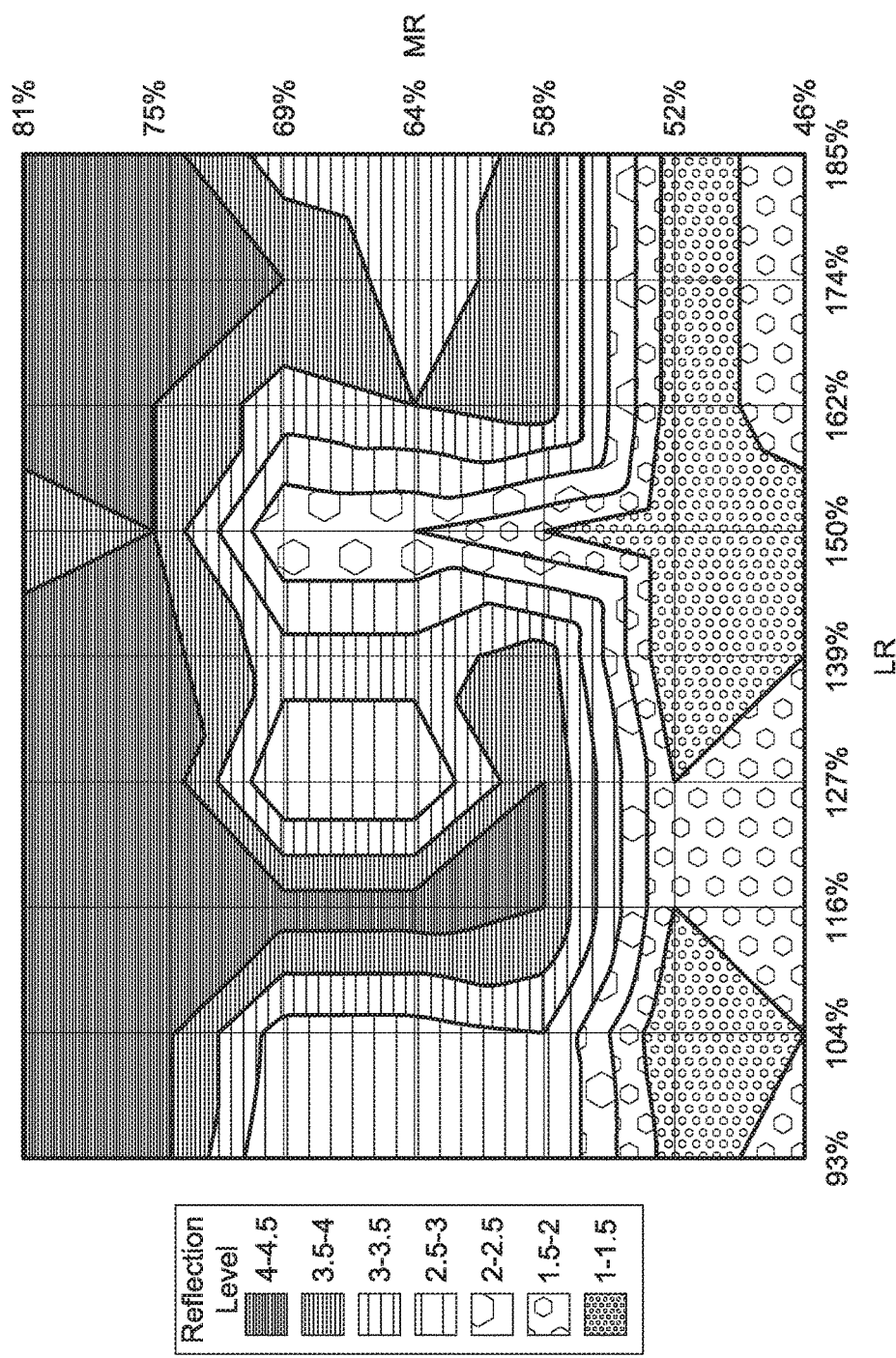
FIGS. 5A-5D are schematic diagrams showing the principles for choosing the pitches and the first length Ly for the slits and the dummy clefts of a touch structure according to disclosed embodiments.
Figure 5B:
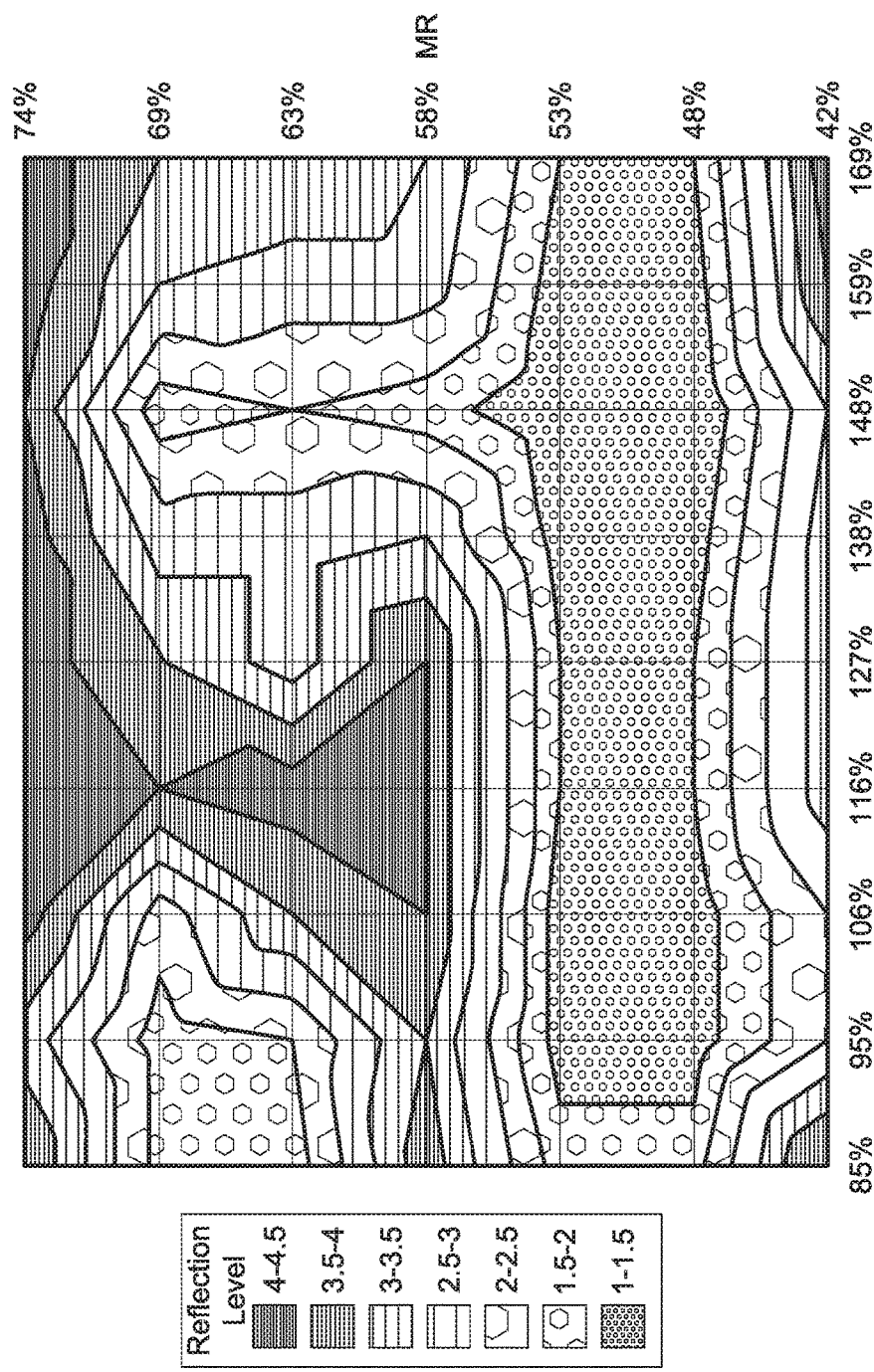
Figure 5C:
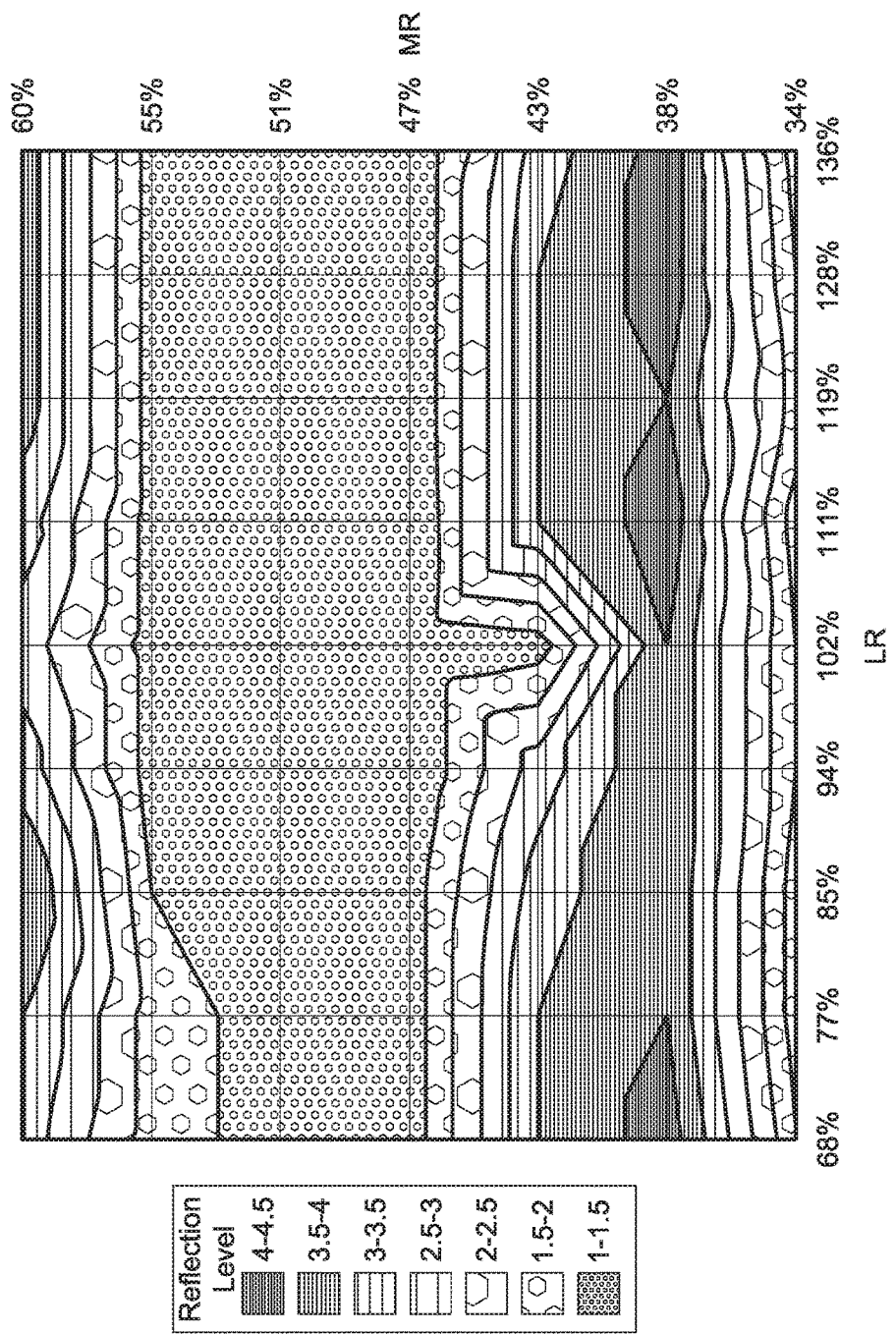
Figure 5D:
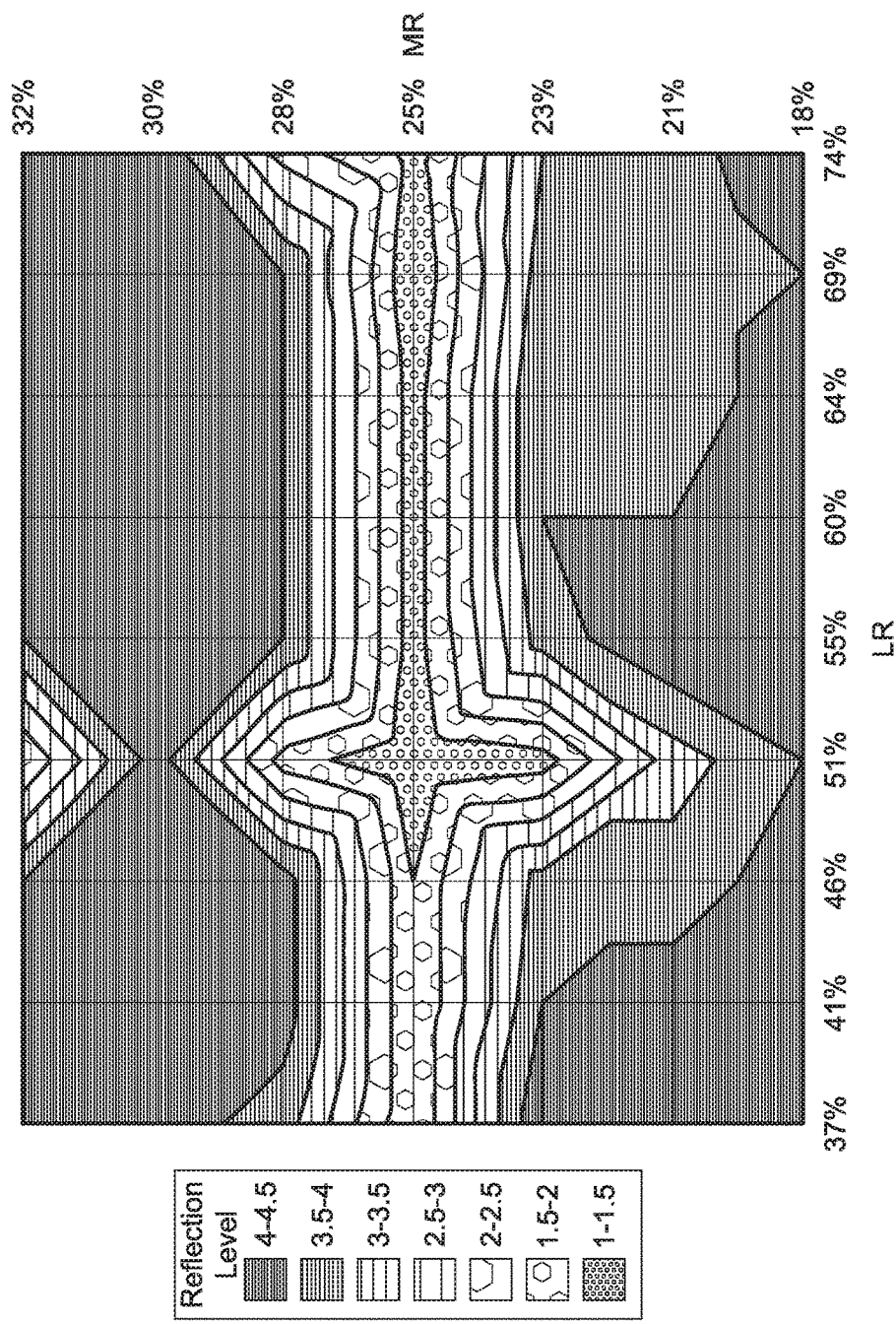

FIGS. 5A-5D show the simulation results of MR (MR1, MR2) and LR. FIG. 5A shows the simulation results obtained when the first pitch P1 is substantially equal to 86.4 μm. FIG. 5B shows the simulation results obtained when the first pitch P1 is substantially equal to 94.5 μm. FIG. 5O shows the simulation results obtained when the first pitch P1 is substantially equal to 117.5 μm. FIG. 5O shows the simulation results obtained when the first pitch P1 is substantially equal to 217.5 μm. The simulation results are acceptable if the reflection level is equal to or larger than 3. As shown in the figures, acceptable reflection level can be obtained when the above formulas are substantially satisfied.

Figure 6:
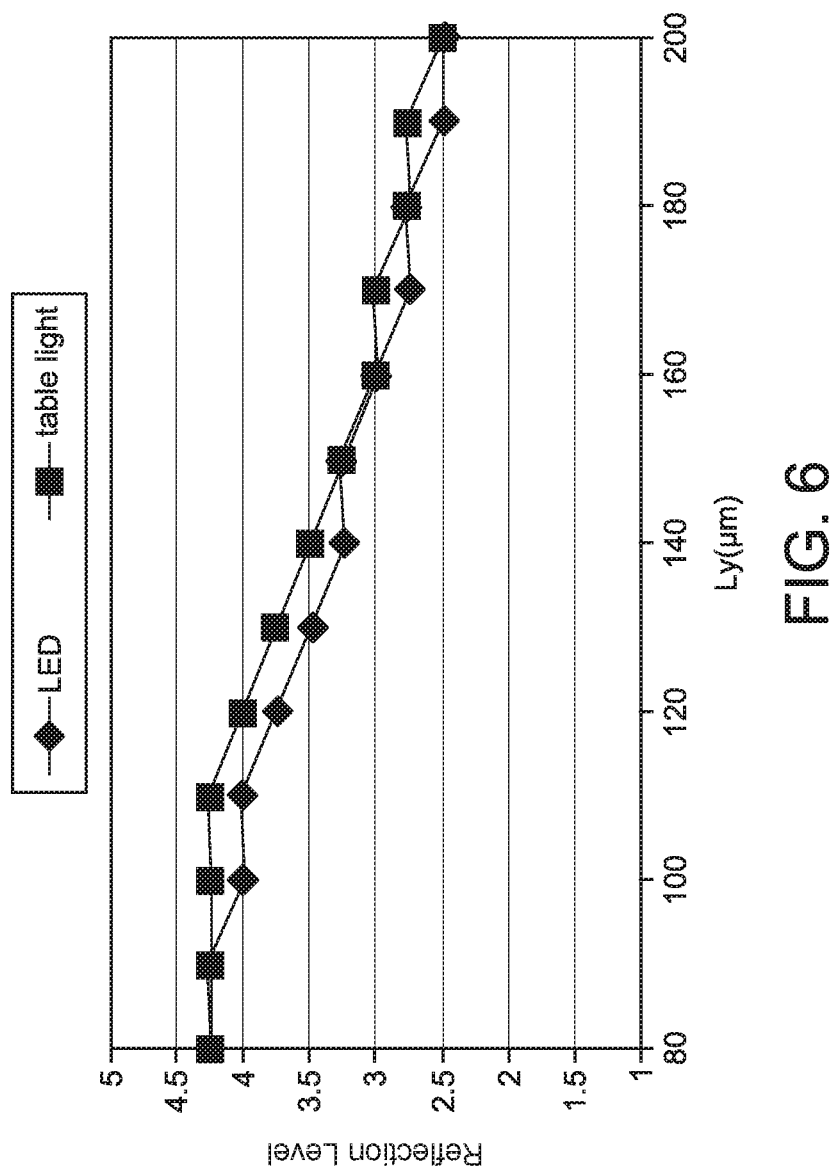
FIG. 6 is a schematic diagram showing the principles for further choosing the first length Ly of the slits and the dummy clefts of a touch structure according to disclosed embodiments.

Referring to FIG. 6, the extreme values of the length Ly can be further determined. FIG. 6 shows the relationship between the length Ly and the reflection level obtained when the second pitch P2 and the third pitch P3 are substantially equal to 70 μm and different light sources are used. The length Ly may be substantially equal to or smaller than or 160 μm in the case that the second pitch P2 and the third pitch P3 are substantially equal to 70 μm.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A touch display panel, comprising:
    a display structure comprising a plurality of pixels, the pixels having a first pitch P1; and
    a touch structure comprising a touch layer, the touch layer having a plurality of slits and a plurality of dummy clefts, each of the slits having a plurality of vertices, wherein the slits defines a plurality of traces and a plurality of touch regions, and the dummy clefts are disposed in the touch regions,
    wherein the slits have a second pitch P2 in a first direction, the dummy clefts have a third pitch P3 in the first direction, and adjacent two of the vertices of each of the slits define a line segment, wherein the line segment has a first length Ly in a second direction perpendicular to the first direction;
    wherein a first moire ratio MR1 is defined as $$\frac{P2}{P1},$$

and the first moire ratio MR1 substantially satisfies a first formula:

20.7%×$A_1$+8.5%×$B_1$−3%≤MR1≤12.7%×$A_1$+16.5%× $B_1$+3%, wherein $A_1$ is an integer from 0 to 3, $B_1$ is an integer from 1 to 3, and 0≤$B_1$−$A_1$≤1;
    wherein a second moire ratio MR2 is defined as $$\frac{P3}{P1},$$

and the second moire ratio MR2 substantially satisfies a second formula:

20.7%×$A_2$+8.5%×$B_2$−3%≤MR2≤12.7%×$A_2$+16.5%× $B_2$+3%, wherein $A_2$ is an integer from 0 to 3, $B_2$ is an integer from 1 to 3, and 0≤$B_2$−$A_2$≤1;
    wherein an arrangement ratio LR is defined as $$\frac{Ly}{P1},$$

and the arrangement ratio LR substantially satisfies a third formula:

(2C+1)×25%−20%≤LR≤(2C+1)×25%+20%, wherein C is an integer from 0 to 11.

2. The touch display panel according to claim 1, wherein $A_1$=$A_2$, and $B_1$=$B_2$.

3. The touch display panel according to claim 1, wherein the third pitch P3 is substantially equal to the second pitch P2.

4. The touch display panel according to claim 1, wherein the second pitch P2 and the third pitch P3 satisfy: 0.66≤P2/P3≤1.5.

5. The touch display panel according to claim 1, wherein the first length Ly is smaller than or equal to 160 μm.

6. The touch display panel according to claim 1, wherein the line segment has a second length Lx in the first direction, and the second length Lx is not equal to the first length Ly.

7. The touch display panel according to claim 1, wherein the line segment has a second length Lx in the first direction, and the second length Lx is substantially equal to the first length Ly.

8. The touch display panel according to claim 1, wherein the line segment has a third length, the dummy clefts have a fourth length, and the third length is larger than the fourth length.

9. The touch display panel according to claim 1, wherein the touch regions comprise transmission sensing zones and reception sensing zones.

10. The touch display panel according to claim 1, wherein the touch layer comprises a transparent electrode layer.

* * * * *